(12) United States Patent
Hashiguchi et al.

(10) Patent No.: US 10,408,350 B2
(45) Date of Patent: Sep. 10, 2019

(54) GLAND PACKING AND GLAND PACKING MANUFACTURING METHOD

(71) Applicant: NIPPON PILLAR PACKING CO., LTD., Osaka (JP)

(72) Inventors: Hideto Hashiguchi, Osaka (JP); Go Takayama, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 0 days.

(21) Appl. No.: 15/564,660

(22) PCT Filed: Mar. 18, 2016

(86) PCT No.: PCT/JP2016/058660
§ 371 (c)(1),
(2) Date: Oct. 5, 2017

(87) PCT Pub. No.: WO2016/163220
PCT Pub. Date: Oct. 13, 2016

(65) Prior Publication Data
US 2018/0080560 A1    Mar. 22, 2018

(30) Foreign Application Priority Data

Apr. 10, 2015  (JP) .................................. 2015-080805
Apr. 20, 2015  (CN) ...................... 2015 2 0239586 U

(51) Int. Cl.
*F16J 15/16*  (2006.01)
*F16J 15/22*  (2006.01)
*F16K 41/02*  (2006.01)

(52) U.S. Cl.
CPC ............... *F16J 15/22* (2013.01); *F16K 41/02* (2013.01)

(58) Field of Classification Search
None
See application file for complete search history.

(56) References Cited

U.S. PATENT DOCUMENTS

| 5,522,603 A | 6/1996 | Naitou et al. |
| 5,803,464 A | 9/1998 | Ueda et al. |

(Continued)

FOREIGN PATENT DOCUMENTS

| CN | 103062564 A | 4/2013 |
| CN | 103104708 A | 5/2013 |

(Continued)

OTHER PUBLICATIONS

International Search Report for PCT/JP2016/058660 dated May 17, 2016.

(Continued)

*Primary Examiner* — Gilbert Y Lee
(74) *Attorney, Agent, or Firm* — Millen, White, Zelano & Branigan, P.C.; William Nixon

(57) ABSTRACT

To provide a gland packing capable of suppressing a fluid from permeating into a packing body or leaking from the packing body through a contact surface between a laminating member and a protrusion of the packing body. The gland packing includes an annular packing body (21) which is formed by winding an expanded graphite tape material in a spiral shape and a laminating member (22) that is bonded to an axial end surface of the packing body (21) and is formed of an annular expanded graphite sheet material, the axial end surface of the packing body (21) being provided with a protrusion (24) facing and contacting an inner peripheral portion or an outer peripheral portion of the laminating member (22) in the radial direction, in which a contact surface (27) between the protrusion (24) and the laminating member (22) is formed so that a radius changes in at least a part in the axial direction.

17 Claims, 21 Drawing Sheets

(56) References Cited

U.S. PATENT DOCUMENTS

| | | | | |
|---|---|---|---|---|
| 5,806,858 | A | * | 9/1998 | Harrelson, III .......... F16J 15/20 277/531 |
| 6,182,974 | B1 | * | 2/2001 | Harrelson, III ........ F16J 15/184 277/531 |
| 6,817,593 | B2 | | 11/2004 | Kato et al. |
| 9,239,115 | B2 | | 1/2016 | Ueda et al. |
| 2005/0218604 | A1 | * | 10/2005 | Shimizu ................... F16J 15/22 277/537 |
| 2015/0123353 | A1 | * | 5/2015 | Asakura ................ F16J 15/125 277/610 |

FOREIGN PATENT DOCUMENTS

| | | | |
|---|---|---|---|
| DE | 3904200 | A1 | 8/1990 |
| JP | H0441157 | U | 4/1992 |
| JP | H0441157 | U1 | 4/1992 |
| JP | H07217745 | A | 8/1995 |
| JP | H07301338 | A | 11/1995 |
| JP | H08219287 | A | 8/1996 |
| JP | 2014190388 | A | 10/2014 |
| WO | 8102454 | A1 | 9/1981 |

OTHER PUBLICATIONS

English Abstract of JP8219287, Publication Date: Aug. 27, 1996.
English Abstract of JPH0441157, Publication Date: Apr. 8, 1992.
English Machine Translation of JP8219287, Publication Date: Aug. 27, 1996.
English Machine Translation of JPH0441157, Publication Date: Apr. 8, 1992.
English Machine Translation for DE-3904200, Publication Date: Aug. 16, 1990.
Extended European Search Report for related European Patent Application No. 16776389.5 dated Nov. 11, 2018.

\* cited by examiner

GLAND PACKING AND GLAND PACKING MANUFACTURING METHOD

TECHNICAL FIELD

The present invention relates to a gland packing used in a shaft sealing portion of a valve or a pump and a gland packing manufacturing method.

BACKGROUND ART

Hitherto, a gland packing has been used in a shaft sealing portion of a valve, a pump, or the like (for example, see Patent Literatures 1 and 2). For example, as illustrated in FIG. 20, gland packings 110 and 111 are loaded into a stuffing box 131 while being externally fitted to a stem (a shaft) 133. Then, a plurality of gland packings 110 and 111 are compressed in the axial direction by a packing retainer 138 fitted to an atmosphere side of the stuffing box 131, whereby the plurality of gland packings 110 and 111 densely contact with an outer peripheral surface of the stem 133 and an inner peripheral surface of the stuffing box 131 to seal a space therebetween.

Among the plurality of gland packings 110 and 111, the gland packing (hereinafter, referred to as a first gland packing) 110 except for both ends in the axial direction is formed of an expanded graphite compression molded body which mainly serves as a seal. The gland packings (hereinafter, referred to as a second gland packing) 111 at both ends in the axial direction are formed by braiding carbon fiber, expanded graphite knitting yarn, or the like and are formed as a braided packing having higher mechanical strength than the first gland packing 110.

The first gland packing 110 includes an annular packing body 121 which is formed by winding an expanded graphite tape material in a spiral shape and compressing the tape material and laminating members 122 and 123 which are formed at both axial end surfaces of the packing body 121 and are formed of an annular expanded graphite sheet material. In the example illustrated in the drawing, two laminating members 122 and 123 are respectively laminated on the axial sides of the packing body 121. Then, both axial ends of the packing body 121 are provided with protrusions 124 and 125 which protrude outward in the axial direction, the laminating members 122 and 123 are respectively formed at the outside and the inside of the protrusions 124 and 125 in the radial direction, and the inner peripheral surface of the laminating member 122 and the outer peripheral surface of the laminating member 123 respectively face and contact the protrusions 124 and 125.

CITATION LIST

Patent Literature

Patent Literature 1: JP 7-217745 A
Patent Literature 2: JP 7-301338 A

SUMMARY OF INVENTION

Technical Problem

As illustrated in FIG. 20, the laminating members 122 and 123 of the first gland packing 110 have a function of preventing a fluid inside a casing of a valve or the like from permeating into the packing body 121 or preventing the fluid permeating into the packing body 121 from leaking to the outside of the gland packing 110. However, since the protrusions 124 and 125 of the packing body 121 and the laminating members 122 and 123 contact with one another through a cylindrical contact surface 127 of which a base line extends linearly along the axial direction, there is a possibility that a fluid permeates into the packing body 121 through the contact surface 127 (see an arrow a) or the fluid permeating into the packing body 121 reversely leaks through the contact surface 127 (see an arrow b). As a result, it is difficult to completely prevent the permeation and the leakage of the fluid with respect to the packing body 121.

Meanwhile, the first gland packing 110 has a problem in which air remains within the spiral tape forming the packing body 121 at a manufacturing stage. However, since there is a possibility that the air remaining inside the packing body 121 may become a leakage path of a sealing fluid, the sealing property of the first gland packing 110 is degraded. Further, when the air remains therein, it is difficult to form the gland packing with a predetermined dimension or density.

An object of the invention is to provide a gland packing capable of suppressing a fluid from permeating into or leaking from a packing body through a contact surface between a laminating member and a protrusion of the packing body. Further, an object of the invention is to provide a gland packing manufacturing method capable of suppressing air from remaining inside the gland packing during manufacturing.

Solution to Problem

A gland packing of the invention includes: an annular packing body which is formed by winding an expanded graphite tape material in a spiral shape; and a laminating member that is bonded to an axial end surface of the packing body and is formed of an annular expanded graphite sheet material, the axial end surface of the packing body being provided with a protrusion facing and contacting an inner peripheral surface or an outer peripheral surface of the laminating member in the radial direction, in which a contact surface between the protrusion and the laminating member is formed so that a radius changes in at least a part in the axial direction.

According to this configuration, since the contact surface between the laminating member and the protrusion of the packing body is formed so that a radius changes in at least a part in the axial direction, a flow passage of a fluid which is about to pass through the contact surface can be set as long as possible. Thus, it is possible to suppress the fluid from permeating into the packing body from the outside through the contact surface or to suppress the fluid from leaking to the outside from the packing body.

The contact surface may have the following configuration.

For example, the contact surface may have a tapered surface of which a radius changes at a constant rate in the axial direction.

Further, when the plurality of laminating members are laminated in the axial direction, the contact surfaces of the laminating members may have tapered surfaces which are inclined in the same direction.

In contrast, the contact surfaces of the plurality of laminating members may have tapered surfaces which are inclined in different directions.

Further, the contact surface may have a curved surface.

A method of manufacturing a gland packing of the invention includes: a first step of molding an annular packing body having a protrusion formed at an axial end surface by winding an expanded graphite tape material in a spiral shape and compressing the tape material; and a second step of allowing an annular laminating member formed of an expanded graphite sheet material to overlap the end surface of the packing body and compressing the packing body and the laminating member while a peripheral surface of the laminating member contacts a peripheral surface of the protrusion, in which in the second step, an axial contact length between the peripheral surface of the laminating member and the peripheral surface of the protrusion before compressing is set to be shorter than a thickness dimension of the laminating member.

According to the invention, since the axial contact length between the peripheral surface of the laminating member and the peripheral surface of the protrusion before compressing in the second step is set to be shorter than the thickness dimension of the laminating member, the air included inside the packing body during the second step is easily discharged to pass through the contact portion between the peripheral surface of the laminating member and the peripheral surface of the protrusion. Thus, since it is possible to suppress the air from remaining inside the molded gland packing, it is possible to improve the sealing property, the dimensional accuracy of the gland packing, and the like.

In the second step, the peripheral surface of the laminating member and the peripheral surface of the protrusion may come into line-contact with each other before compressing.

With such a configuration, the air included in the packing body can be more easily discharged.

In the second step, at least one of the peripheral surface of the laminating member and the peripheral surface of the protrusion before compressing may be formed so that a radius changes in at least a part in the axial direction.

With such a configuration, the axial contact length between the peripheral surface of the laminating member and the peripheral surface of the protrusion can be easily shortened.

At least one of the peripheral surface of the laminating member and the peripheral surface of the protrusion may have a tapered surface.

When the plurality of laminating members are laminated in the axial direction, the peripheral surfaces of the laminating members may have tapered surfaces which are inclined in the same direction or may have tapered surfaces which are inclined in the opposite directions.

Advantageous Effects of Invention

According to the gland packing of the invention, it is possible to suppress the permeation or leakage of the fluid through the contact surface between the laminating member and the protrusion of the packing body. Further, according to the gland packing manufacturing method of the invention, since air easily escapes between the laminating member and the protrusion of the packing body in the second step, it is possible to prevent the air from remaining inside the manufactured gland packing.

DESCRIPTION OF EMBODIMENTS

Hereinafter, an embodiment of a gland packing of the invention will be described in detail with reference to the accompanying drawings.

Figure 1:
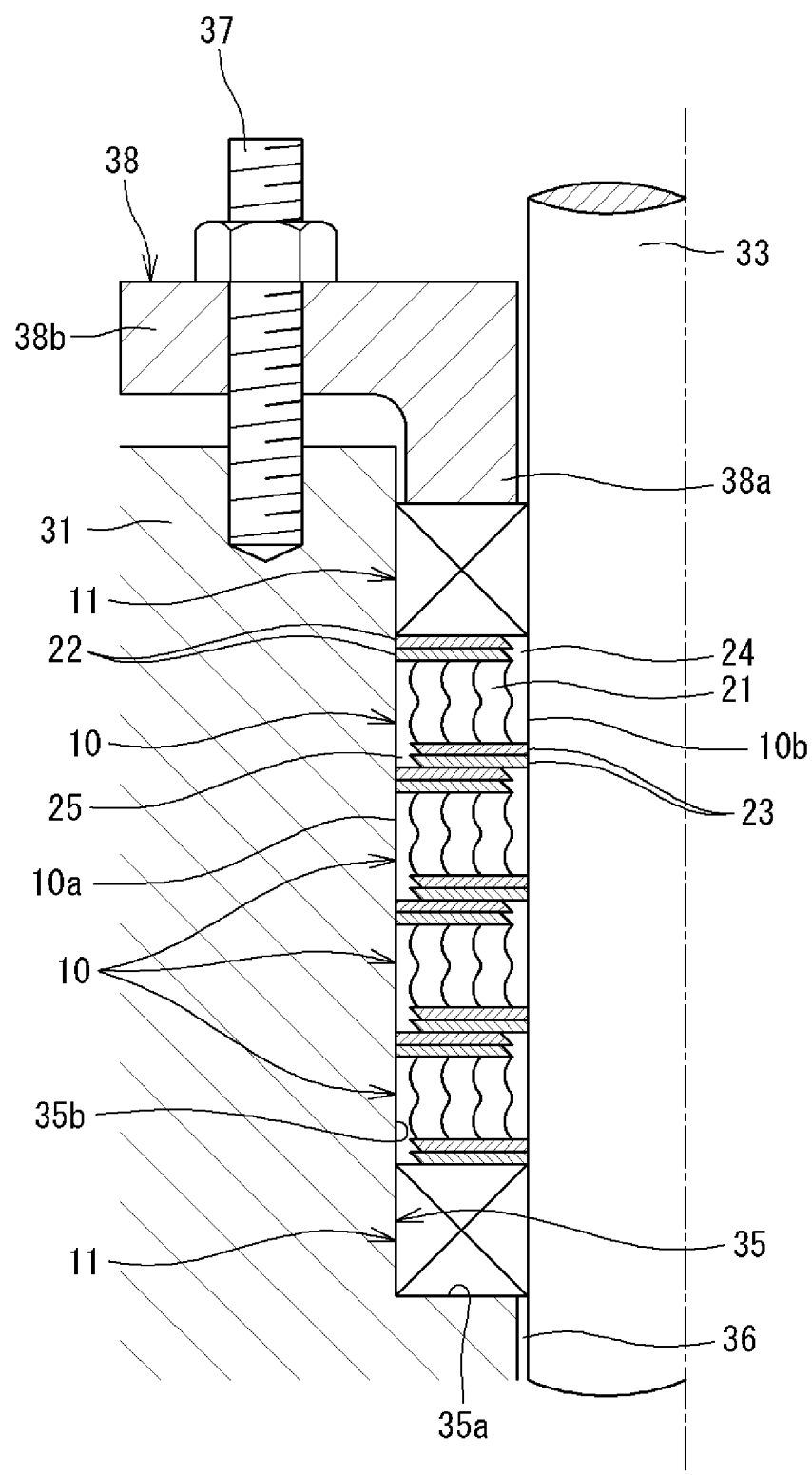
FIG. 1 is a cross-sectional explanatory diagram illustrating a use state of a gland packing according to an embodiment.

FIG. 1 is a cross-sectional explanatory diagram illustrating a use state of a gland packing according to an embodiment of the invention. Ground packings 10 and 11 of the embodiment are loaded on a stuffing box 31 and are used to seal a gap between the stuffing box 31 and a stem (shaft) 33 passing through the stuffing box. The stuffing box 31 is provided with a cylindrical packing storage recess (cylindrical hole) 35 which is opened to an atmosphere side (the upside in FIG. 1) and includes a bottom surface 35*a* at the inside of a device (the downside in FIG. 1). A hole 36 through which the stem 33 passes is formed at the center of the bottom surface 35*a* of the packing storage recess 35.

The plurality of gland packings 10 and 11 are all formed in an annular shape and are loaded into the packing storage recess 35 of the stuffing box 31 from the atmosphere side opening of the packing storage recess 35. A packing retainer 38 is attached to the outer surface of the stuffing box 31 by an attachment bolt 37. The packing retainer 38 includes a cylindrical pressing portion 38a which is fitted into the packing storage recess 35 and a flange portion 38b which extends in the radial direction from the end of the pressing portion 38a and the flange portion 38b is attached to the stuffing box 31 by the attachment bolt 37.

A front end of the pressing portion 38a comes into contact with the gland packing 11 disposed in an axial end inside the packing storage recess 35. Then, when the attachment bolt 37 is tightened, the plurality of gland packings 10 and 11 between the bottom surface 35a of the packing storage recess 35 and a front end surface of the pressing portion 38a are compressed in the axial direction. Accordingly, an inner peripheral surface 10b of the gland packing 10 densely contacts an outer peripheral surface of the stem 33 and an outer peripheral surface 10a of the gland packing 10 densely contacts an inner peripheral surface 35b the packing storage recess 35 of the stuffing box 31, so that a gap between the stuffing box 31 and the stem 33 is sealed.

The plurality of gland packings 10 and 11 which are stored in the stuffing box 31 include the first gland packing 10 and the second gland packing 11. In the example illustrated in FIG. 1, four first gland packings 10 and two gland packings 11 are stored inside the stuffing box 31 to be arranged in the axial direction. The second gland packings 11 are disposed at both axial ends inside the stuffing box 31 and four first gland packings 10 are disposed between two second gland packings 11.

The second gland packing 11 is formed of a braided packing having higher mechanical strength than the first gland packing 10. Specifically, the second gland packing 11 is formed by braiding carbon fiber, expanded graphite knitted yarn or the like. The second gland packing 11 increases its strength so as to be prevented from being bitten in a gap between the stuffing box 31 and the stem 33, a gap between the stuffing box 31 and the packing retainer 38, and a gap between the stem 33 and the packing retainer 38.

The first gland packing 10 includes a packing body 21 and laminating members 22 and 23. The packing body 21 is formed in an annular shape by expanded graphite. Further, the packing body 21 is formed to have a substantially rectangular cross-sectional shape. The packing body 21 is primarily formed by loading an expanded graphite tape material wound in a spiral shape into a molding die and compressing the expanded graphite by a pressing machine. An inner radial end of one end axial end surface of the packing body 21 is provided with a first protrusion 24 which protrudes outward in the axial direction (upward in FIG. 1). An outer radial end of the other axial end surface of the packing body 21 is provided with a second protrusion 25 which protrudes outward in the axial direction (downward in FIG. 1).

The laminating members 22 and 23 are formed in an annular shape. Specifically, the laminating members 22 and 23 are formed by punching out an expanded graphite sheet material into a ring shape. The laminating members 22 and 23 are respectively provided at both axial end surfaces of the packing body 21. The laminating members 22 and 23 and a primarily molded article of the packing body 21 are loaded on a molding die and are compressed by a pressing machine to be secondarily molded and integrated. In addition, a more detailed manufacturing method of the gland packing will be described later.

The laminating members 22 and 23 include a first laminating member 22 which is provided at one axial end surface of the packing body 21 and a second laminating member 23 which is provided at the other axial end surface thereof.

The first laminating member 22 is disposed at the outside of the first protrusion 24 in the radial direction.

An inner peripheral surface of the first laminating member 22 faces an outer peripheral surface of the first protrusion 24 and densely contacts the outer peripheral surface. Further, in the description below, the inner peripheral surface of the first laminating member 22 and the outer peripheral surface of the first protrusion 24 which contact each other are generally referred to as "contact surfaces". In the embodiment, the two first laminating members 22 are provided to overlap each other in the axial direction.

The second laminating member 23 is disposed at the inside of the second protrusion 25 in the radial direction. Then, an outer peripheral surface of the second laminating member 23 faces an inner peripheral surface of the second protrusion 25 and densely contacts the inner peripheral surface. In the description below, the outer peripheral surface of the second laminating member 23 and the inner peripheral surface of the second protrusion 25 are generally referred to as "contact surfaces". In the embodiment, the two second laminating members 23 are provided to overlap each other in the axial direction.

Figure 2:
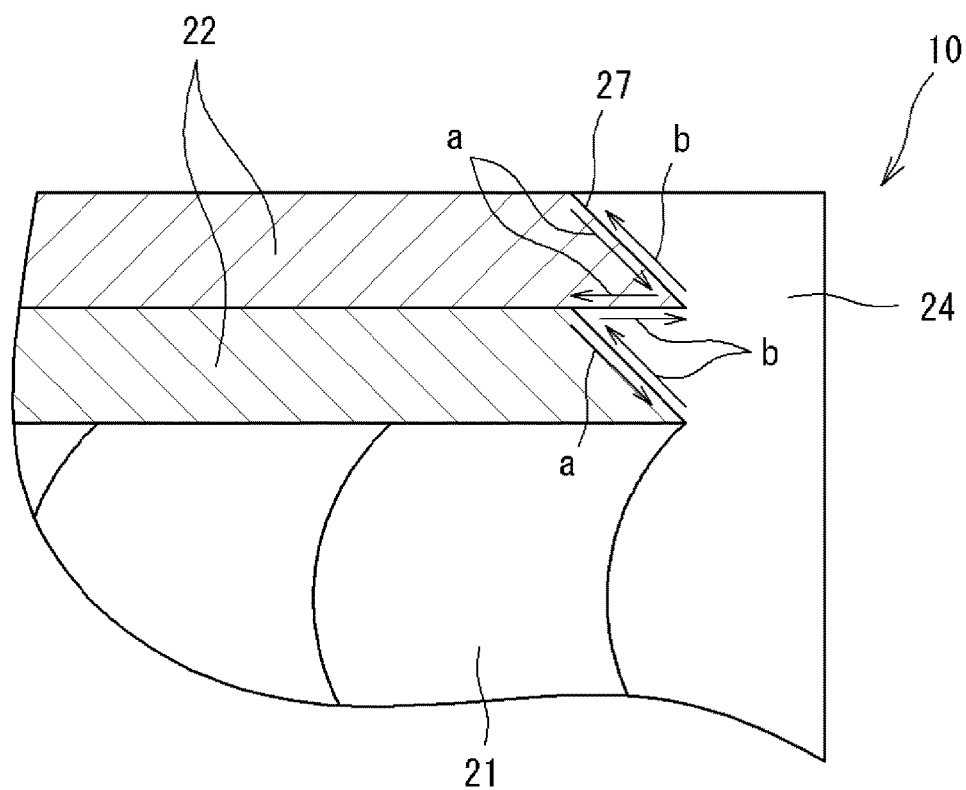
FIG. 2 is an enlarged cross-sectional view illustrating a part of the gland packing.

FIG. 2 is an enlarged cross-sectional view illustrating a part of the first gland packing 10.

A radius of a contact surface 27 between the first laminating member 22 and the first protrusion 24 from the axis of the first laminating member 22 (the center of the axis 33) changes. Specifically, the contact surface 27 has a tapered surface of which a radius changes at a constant rate in the axial direction.

Each of the inner peripheral surfaces (the contact surfaces 27) of the two first laminating members 22 is formed as a tapered surface of which a radius increases as it goes outward in the axial direction (upward in FIG. 2). Further, the two first laminating members 22 are formed in the same shape and both inner peripheral surfaces have a saw tooth cross-sectional shape as a whole.

Since the outer peripheral surface of the first protrusion 24 densely contacts the inner peripheral surface of the first laminating member 22, the outer peripheral surface is formed as a tapered surface having the same shape as the inner peripheral surface of the first laminating member 22 and has a saw tooth cross-sectional shape in the axial direction as a whole.

Figure 20:
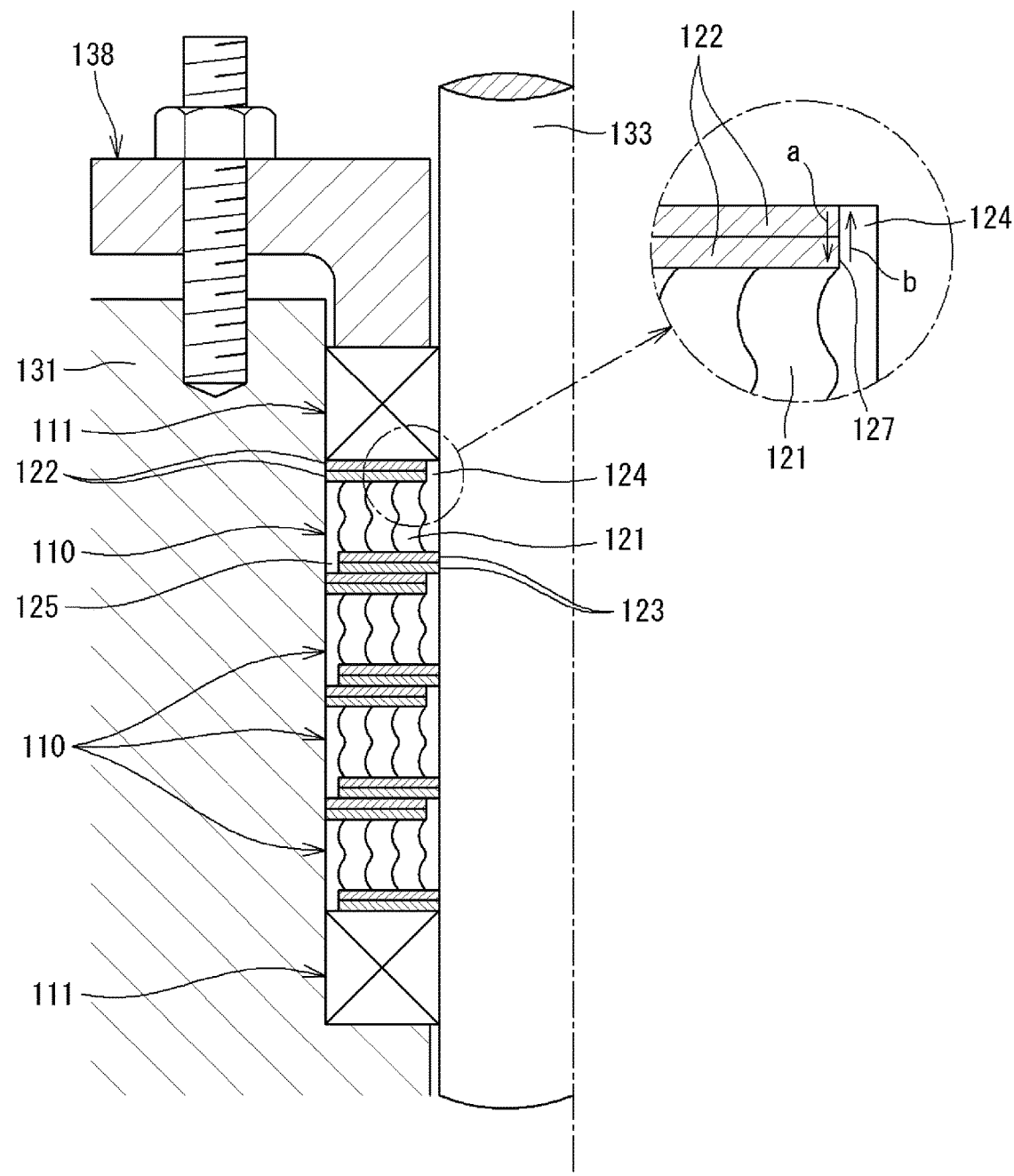
FIG. 20 is a cross-sectional explanatory diagram illustrating a use state of a conventional gland packing.

In the embodiment, since the contact surface 27 between the first laminating member 22 and the first protrusion 24 of the packing body 21 has a tapered surface, the contact surface 27 becomes long and bent compared to the related art illustrated in FIG. 20. For that reason, since a path through which the fluid passes becomes long when a fluid such as a gas, a liquid, or the like is about to permeate into the packing body 21 from the outside through the contact surface 27 (see an arrow a) or when the fluid inside the packing body 21 is about to leak through the contact surface 27 (see an arrow b), it is possible to suppress the permeation or leakage of the fluid.

Additionally, as illustrated in FIG. 1, the contact surface between the second laminating member 23 and the second protrusion 25 also has a tapered surface. Since a relation between the second laminating member 23 and the second protrusion 25 is the same as a relation between the first laminating member 22 and the first protrusion 24 except for the reverse arrangement in the radial direction, a detailed description thereof will be omitted.

FIGS. 3 to 10 illustrate modified examples of the contact surface 27 between the first laminating member 22 and the first protrusion 24.

Figure 3:
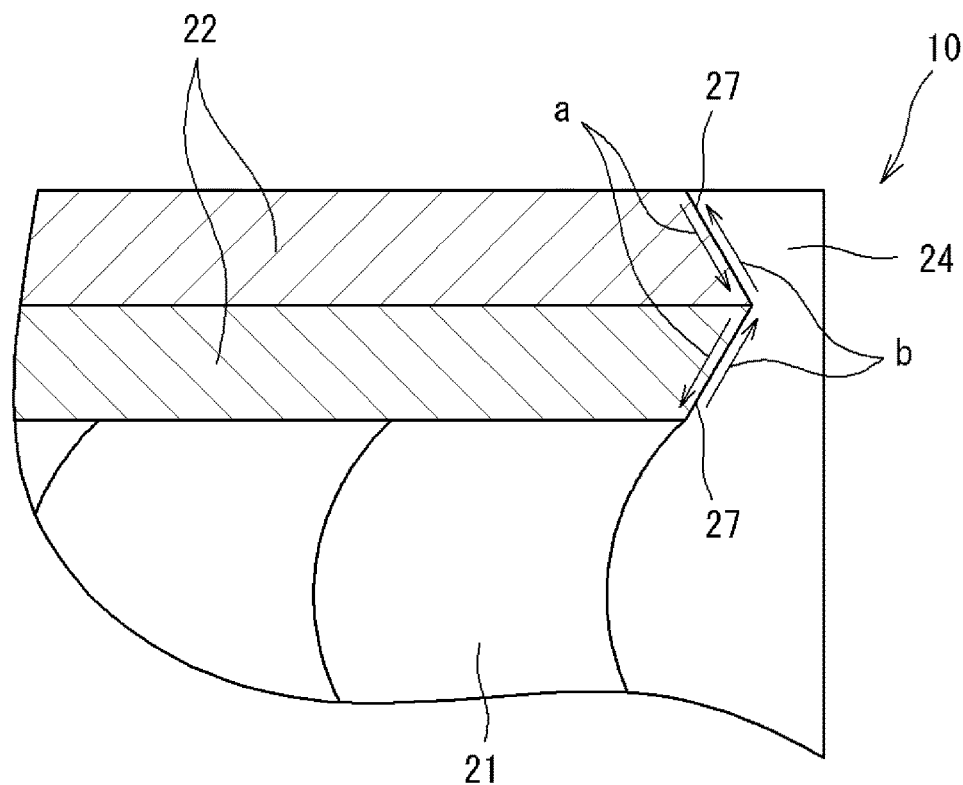
FIG. 3 is an enlarged cross-sectional view illustrating a part of a gland packing according to a modified example.

In the modified example illustrated in FIG. 3, the inner peripheral surfaces (the contact surfaces 27) of the two first laminating members 22 are formed as tapered surfaces which are inclined in the opposite direction to each other. Specifically, a radius of the inner peripheral surface of the first laminating member 22 disposed at the outside in the axial direction (the upside in FIG. 3) increases as it goes outward in the axial direction and a radius of the inner peripheral surface of the first laminating member 22 disposed at the inside of the axial direction (the downside in FIG. 3) decreases as it goes outward in the axial direction. The two first laminating members 22 have the same shape and are disposed so that their front and back surfaces are reversed to each other.

Thus, even in the modified example, the contact surface 27 becomes long and bent compared to the related art illustrated in FIG. 20. For that reason, since a path through which a fluid passes also becomes long, the permeation or leakage of the fluid with respect to the packing body 21 can be suppressed.

Figure 4:
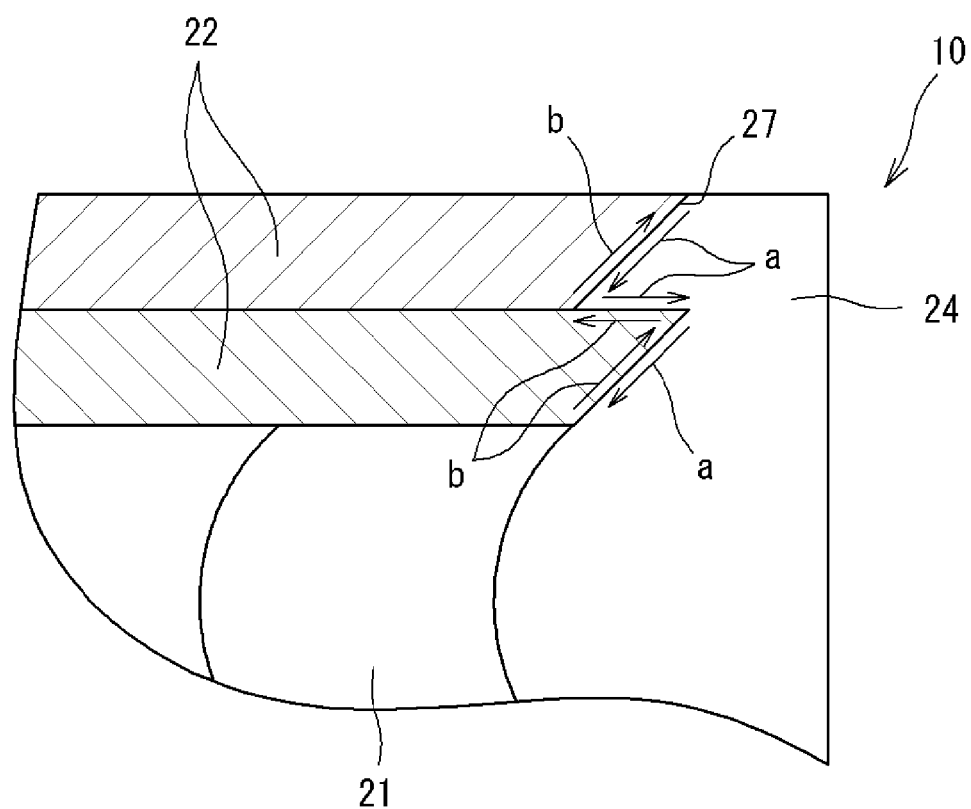
FIG. 4 is an enlarged cross-sectional view illustrating a part of a gland packing according to a modified example.

In the modified example illustrated in FIG. 4, each of the inner peripheral surfaces (the contact surfaces 27) of the two first laminating members 22 is formed as a tapered surface of which a radius decreases as it goes outward in the axial direction (the upside in FIG. 4). Even in the modified example, since the two first laminating members 22 have the same shape, the contact surface 27 has a saw tooth cross-sectional shape as a whole. Thus, similarly to the above-described embodiment, the fluid path can become long and the permeation (the arrow a) or the leakage (the arrow b) of the fluid with respect to the packing body 21 can be suppressed.

Figure 5:
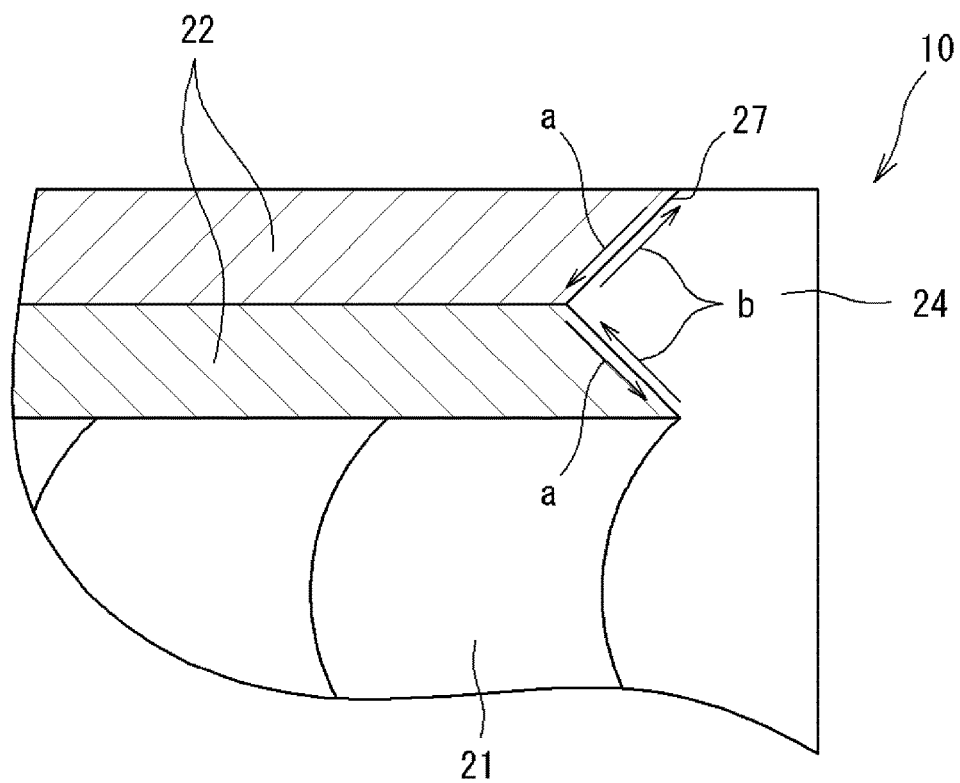
FIG. 5 is an enlarged cross-sectional view illustrating a part of a gland packing according to a modified example.

In the modified example illustrated in FIG. 5, the inner peripheral surfaces (the contact surfaces 27) of the two first laminating members 22 are formed as tapered surfaces which are inclined in the opposite directions. Specifically, the inner peripheral surface of the first laminating member 22 disposed at the outside in the axial direction (the upside in FIG. 5) is formed so that a radius decreases as it goes outward in the axial direction and the inner peripheral surface of the first laminating member 22 disposed at the inside of the axial direction (the downside in FIG. 3) is formed so that a radius increases as it goes outward in the axial direction. The two first laminating members 22 have the same shape and are disposed so that their front and rear surfaces are reversed to each other.

Even in the modified example, the contact surface 27 becomes long compared to the related art illustrated in FIG. 20. For that reason, since a fluid path at the time when a fluid permeates into or leaks from the packing body 21 also becomes long, the permeation or leakage of the fluid with respect to the packing body 21 can be suppressed.

Figure 6:
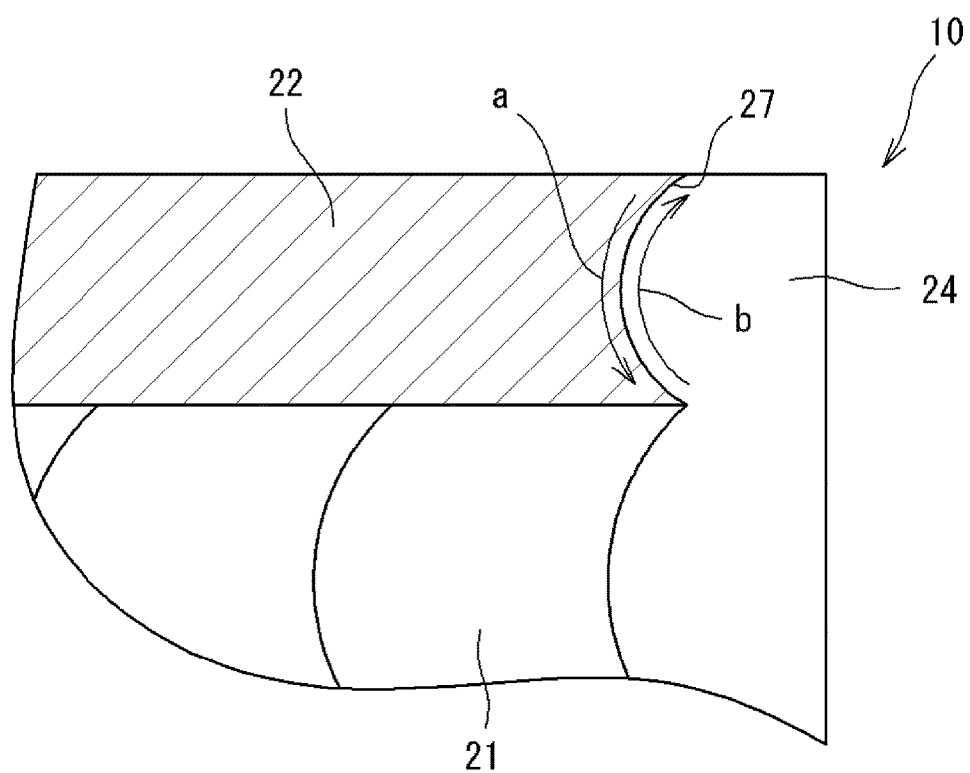
FIG. 6 is an enlarged cross-sectional view illustrating a part of a gland packing according to a modified example.

In the modified example illustrated in FIG. 6, the first gland packing 10 is provided with one first laminating member 22 and the inner peripheral surface (the contact surface 27) of the first laminating member 22 is formed as a curved surface curved in a circular-arc shape. Specifically, the inner peripheral surface of the first laminating member 22 is formed as a concave curved surface of which a radius increases as it goes toward the center in the axial direction.

Even in the modified example, since the contact surface 27 becomes long compared to the related art illustrated in FIG. 20, the permeation or leakage of the fluid with respect to the packing body 21 through the contact surface 27 can be suppressed.

Figure 7:
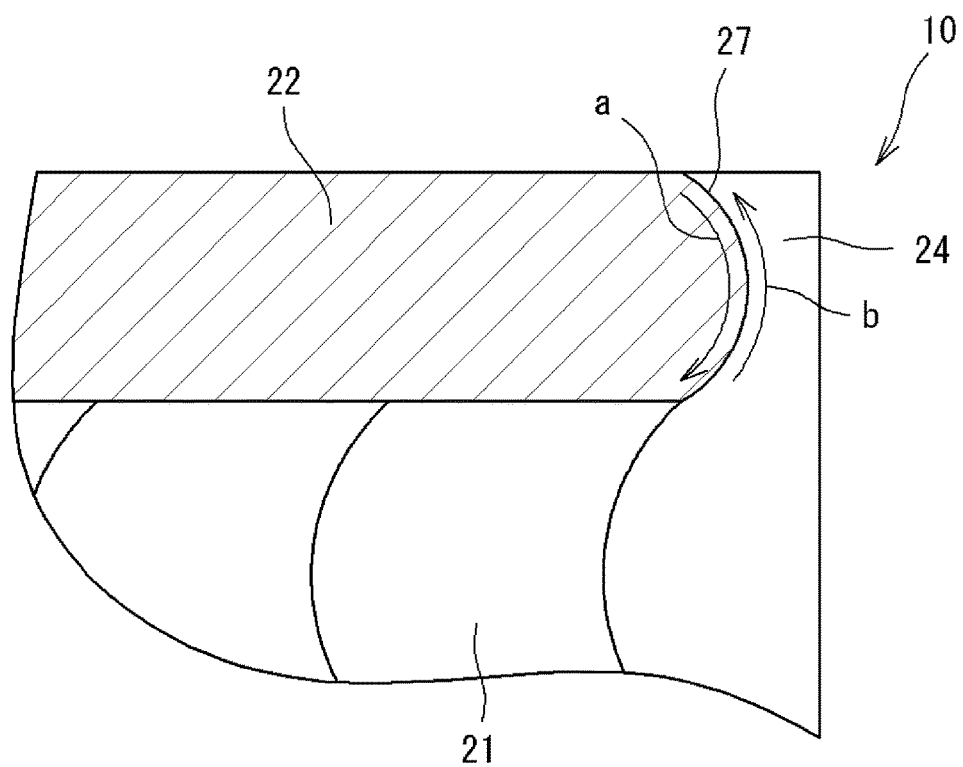
FIG. 7 is an enlarged cross-sectional view illustrating a part of a gland packing according to a modified example.

In the modified example illustrated in FIG. 7, the first gland packing 10 is provided with one first laminating member 22 and the inner peripheral surface (the contact surface 27) of the first laminating member 22 is formed as a curved surface which is curved in a circular-arc shape. Specifically, the inner peripheral surface of the first laminating member 22 is formed as a convex curved surface of which a radius decreases as it goes toward the center in the axial direction.

Even in the modified example, since the contact surface 27 becomes long compared to the related art illustrated in FIG. 20, the permeation or leakage of the fluid with respect to the packing body 21 through the contact surface 27 can be suppressed.

Figure 8:
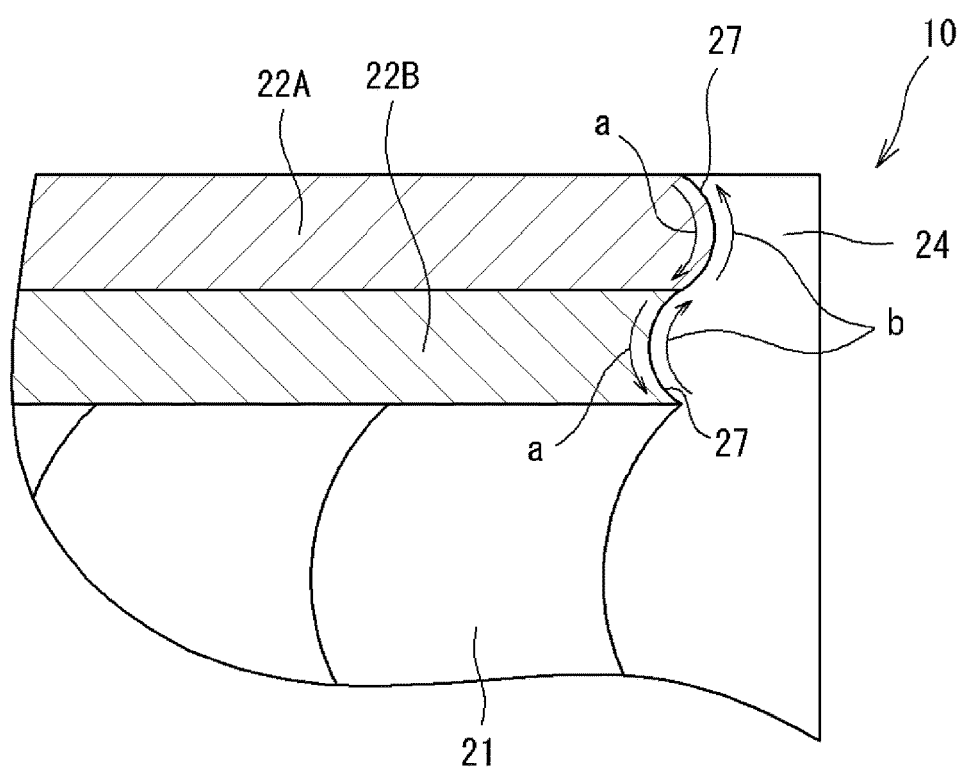
FIG. 8 is an enlarged cross-sectional view illustrating a part of a gland packing according to a modified example.

In the modified example illustrated in FIG. 8, the first gland packing 10 is provided with two first laminating members 22A and 22B, the inner peripheral surface (the contact surface 27) of one first laminating member 22A is formed as a convex curved surface, and the inner peripheral surface (the contact surface 27) of the other first laminating member 22B is formed as a concave curved surface. Thus, the contact surface 27 is formed in a wave shape as a whole.

Even in the modified example, since the contact surface 27 becomes long compared to the related art illustrated in FIG. 20, the permeation or leakage of the fluid with respect to the packing body 21 through the contact surface 27 can be suppressed.

Figure 9:
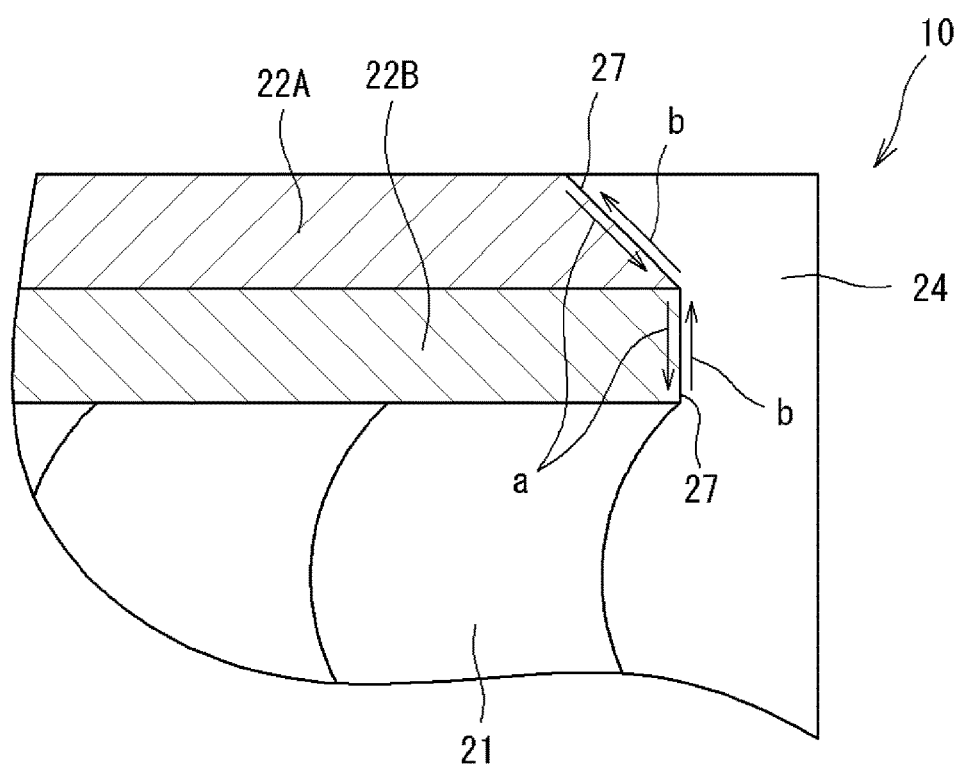
FIG. 9 is an enlarged cross-sectional view illustrating a part of a gland packing according to a modified example.

In the modified example illustrated in FIG. 9, the first gland packing 10 is provided with the two first laminating members 22A and 22B, the inner peripheral surface (the contact surface 27) of one first laminating member 22A is formed as a tapered surface, and the inner peripheral surface (the contact surface 27) of the other first laminating member 22B is formed as a surface along the axial direction. Thus, the contact surface 27 is formed so that a radius changes in a part in the axial direction.

Even in the embodiment, since the contact surface 27 becomes long compared to the related art illustrated in FIG. 20, the permeation or leakage of the fluid through the contact surface 27 can be suppressed.

Figure 10:
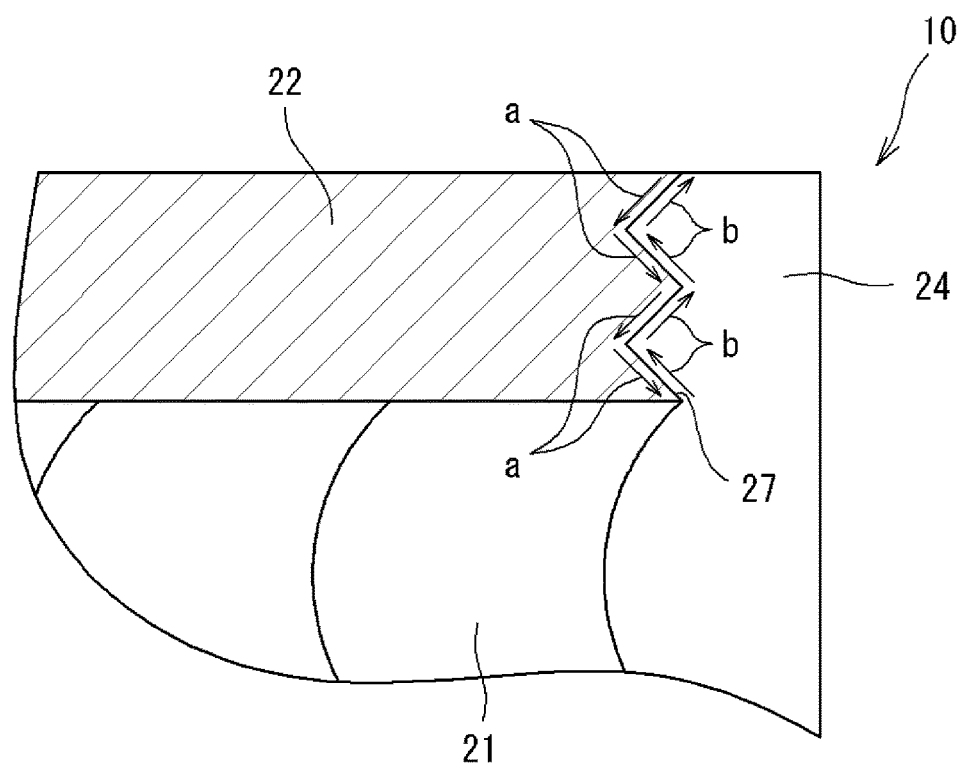
FIG. 10 is an enlarged cross-sectional view illustrating a part of a gland packing according to a modified example.

In the modified example illustrated in FIG. 10, the first gland packing 10 is provided with one first laminating member 22 and the inner peripheral surface (the contact surface 27) of the first laminating member 22 is formed so that a plurality of tapered surfaces inclined in the opposite directions are alternately arranged in the axial direction. As a result, the entire contact surface 27 is formed in a saw tooth shape.

Thus, even in the modified example, since the contact surface 27 becomes long compared to the related art illustrated in FIG. 20, the permeation or leakage of the fluid through the contact surface 27 can be suppressed.

The above-described modified examples illustrated in FIGS. 3 to 10 illustrate only a relation between the first laminating member 22 and the first protrusion 24, but can be also applied to a relation between the second laminating member 23 and the second protrusion 25.

Next, a method of manufacturing the first gland packing 10 will be described in detail.

The first gland packing 10 is manufactured by compression molding using a molding die. Specifically, a method of manufacturing the first gland packing 10 includes a primary molding step (a first step) of molding the packing body 21 and a secondary molding step (a second step) of bonding the first and second laminating members 22 and 23 to the primarily molded packing body 21.

Figure 11:
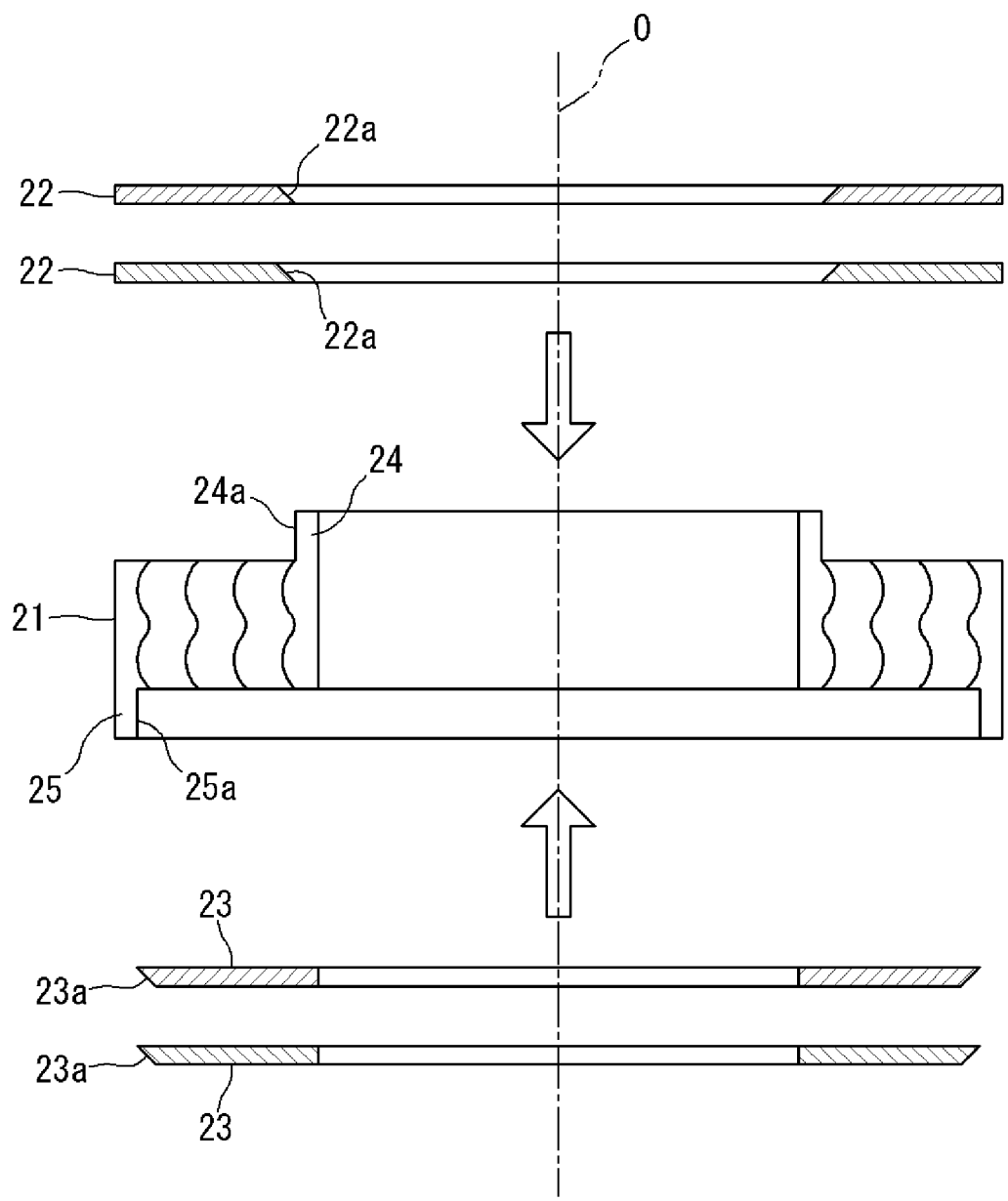
FIG. 11 is a cross-sectional view illustrating a packing body and a laminating member before second molding of the gland packing.

In the primary molding step, the packing body 21 is molded by winding an expanded graphite tape material in a spiral shape, loading the material on a molding die, and compressing the material by a pressing machine. FIG. 11 illustrates the primarily molded packing body 21. By this molding, the first protrusion 24 and the second protrusion 25 are respectively formed at both axial end surfaces of the packing body 21.

The first and second laminating members 22 and 23 are formed by punching out an expanded graphite sheet material into a ring shape using a Thomson blade or the like.

In the secondary molding step, the first laminating member 22 which is formed in an annular shape concentrically overlaps one axial end surface of the primarily molded packing body 21 and the second laminating member 23 concentrically overlaps the other axial end surface of the packing body 21. The axes of the packing body 21 and the first and second laminating members 22 and 23 are indicated by "O". Then, these members are loaded on the molding die and are compressed by the pressing machine so that the first and second laminating members 22 and 23 are bonded to the packing body 21.

Figure 12:
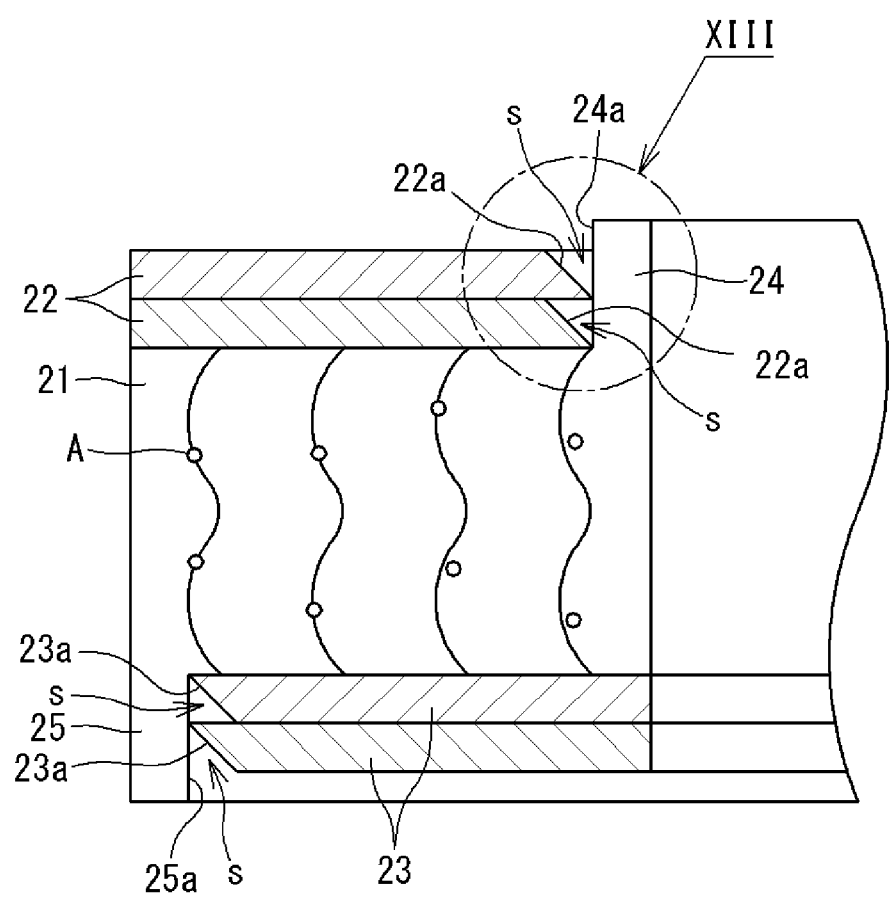
FIG. 12 is a cross-sectional view illustrating a packing body and a laminating member before compression in a second molding step.

FIG. 12 is a cross-sectional view illustrating the packing body and the laminating member before compression in the secondary molding step.

In the primarily molded packing body 21, air A may be included between the expanded graphite tape wound in a spiral shape. In the embodiment, a following structure is provided to discharge the air A included in the packing body 21 by the secondary molding step.

As illustrated in FIGS. 11 and 12, an inner peripheral surface 22a of the first laminating member 22 is formed as a tapered surface of which a radius changes at a constant rate in the axial direction. Further, a radius of the inner peripheral surface 22a of the first laminating member 22 increases as it goes outward in the axial direction (upward in FIG. 11). The two first laminating members 22 having the same configuration are used.

On the contrary, an outer peripheral surface 24a of the first protrusion 24 is formed as a cylindrical surface having a constant radius.

Then, as illustrated in FIG. 12, a front end of the tapered surface which is the inner peripheral surface 22a of the first laminating member 22 contacts the outer peripheral surface 24a of the first protrusion 24 so that both members come into line-contact with each other. In other words, an axial contact length between the inner peripheral surface 22a of the first laminating member 22 and the outer peripheral surface 24a of the first protrusion 24 is shorter than an axial thickness of the first laminating member 22. Accordingly, a gap s is formed between the inner peripheral surface 22a of the first laminating member 22 and the outer peripheral surface 24a of the first protrusion 24.

An outer peripheral surface 23a of the second laminating member 23 is formed as a tapered surface of which a radius changes at a constant rate in the axial direction. Further, a radius of the outer peripheral surface 23a of the second laminating member 23 decreases as it goes outward in the axial direction (downward in FIG. 11). The two second laminating members 23 having the same configuration are used.

On the contrary, an inner peripheral surface 25a of the second protrusion 25 is formed as a cylindrical surface having a constant radius.

Then, as illustrated in FIG. 12, the front end of the tapered surface which is the outer peripheral surface 23a of the second laminating member 23 contacts the inner peripheral surface 25a of the second protrusion 25 so that both members come into line-contact with each other. In other words, an axial contact length between the outer peripheral surface 23a of the second laminating member 23 and the inner peripheral surface 25a of the second protrusion 25 is shorter than an axial thickness of the second laminating member 23.

Figure 21:
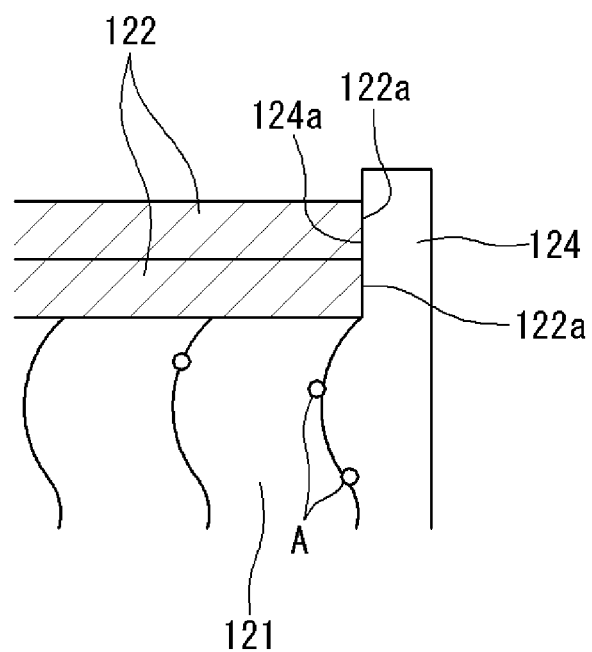
FIG. 21 is a cross-sectional view illustrating a relation between a first laminating member and a first protrusion before compression in a second molding step of a conventional manufacturing method.

FIG. 21 illustrates a relation between the first laminating member 122 and the first protrusion 124 before compressing in the second molding step of the related art which is a comparison target. Conventionally, an inner peripheral surface 122a of the laminating member 122 is formed as a cylindrical surface having a constant radius and the inner peripheral surface 122a of the laminating member 122 and an outer peripheral surface 124a of the first protrusion 124 come into plane-contact with each other in the thickness range of the laminating member 122. For that reason, a resistance at the time when the air A included in the packing body 121 is discharged between the inner peripheral surface 122a of the laminating member 122 and the outer peripheral surface 124a of the first protrusion 124 increases. As a result, there is a high possibility that the air A is not easily discharged and may remain inside the packing body 121.

Figure 13:
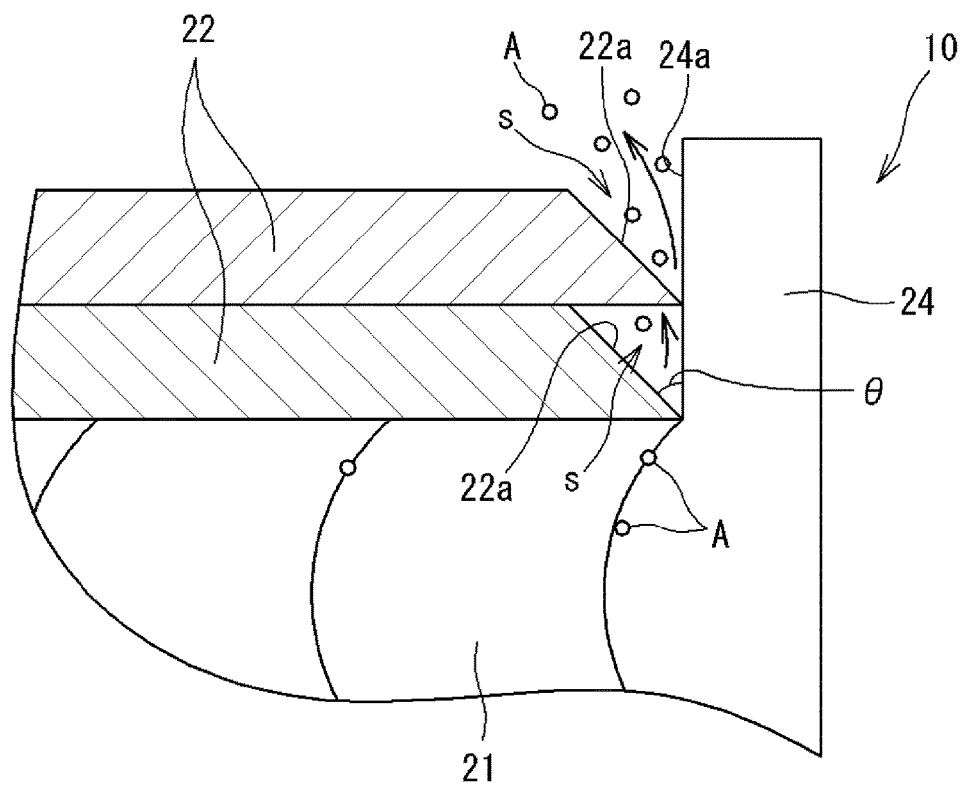
FIG. 13 is an enlarged view illustrating a part XIII of FIG. 12.

In the embodiment, as illustrated in FIG. 12, the inner peripheral surface 22a of the first laminating member 22 is formed as a tapered surface and comes into line-contact with the outer peripheral surface 24a of the first protrusion 24. Accordingly, the axial contact length between both peripheral surfaces 22a and 24a is shortened and a gap s is formed between both peripheral surfaces 22a and 24a. For that reason, as illustrated in FIG. 13, when the packing body 21 is compressed in the secondary molding step, the air A included therein is easily discharged to the outside through the contact portion and the gap s as indicated by an arrow. For that reason, it is possible to suppress the air A from remaining inside the secondarily molded first gland packing 10.

Similarly, as illustrated in FIG. 12, the outer peripheral surface 23a of the second laminating member 23 is formed as a tapered surface and comes into line-contact with the inner peripheral surface 25a of the second protrusion 25. Accordingly, the axial contact length between both peripheral surfaces 23a and 25a is shortened and a gap s is formed between both peripheral surfaces 23a and 25a. For that reason, when the packing body 21 is compressed in the secondary molding step, the air A included therein is easily discharged to the outside through the gap s. For that reason, it is possible to suppress the air A from remaining inside the secondarily molded first gland packing 10.

Figure 19:
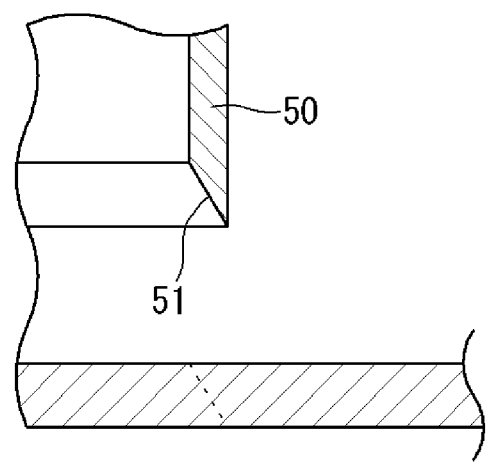
FIG. 19 is a cross-sectional view illustrating a laminating member cutting process.

In addition, the tapered surface can be formed by, for example, an edge surface of a Thomson blade punching the laminating members 22 and 23. For example, as illustrated in FIG. 19, when the expanded graphite sheet material is punched by a Thomson blade 50, a tapered surface can be formed in such a manner that a blade surface 51 is directed to a side where the tapered surface needs to be formed. The Thomson blade 50 is not limited to a single blade but may be a double blade.

As described above, when the amount of the air A remaining in the secondarily molded first gland packing 10 is small, the following effect can be obtained.

There is a possibility that the air A remaining inside the first gland packing 10 may become a leakage path of a sealing fluid when the gland packing is used in the shaft sealing portion. In the embodiment, since the amount of the air remaining in the first gland packing 10 can be decreased, the sealing fluid leakage path also decreases and thus the sealing property can be improved.

Further, when the amount of the air remaining inside the secondarily molded first gland packing 10 decreases, the dimension or the density of the first gland packing 10 can be easily set to a predetermined value. Accordingly, the accuracy of the dimension or the density of the first gland packing 10 can be improved.

Furthermore, when the amount of the air remaining inside the secondarily molded first gland packing 10 decreases, a change in dimension with time in use can be suppressed. For that reason, the durability of the first gland packing 10 can be improved.

Further, when the amount of the air remaining inside the secondarily molded first gland packing 10 decreases, the damage of the first gland packing 10 can be suppressed. As this damage, for example, occurrence of cracks on the surface of the first gland packing 10, peeling of the laminate members 22, 23, or the like can be cited.

Angles θ (see FIG. 13) of the peripheral surfaces 22a and 23a of the laminating members 22 and 23 with respect to the vertical direction (the axis direction) can be set to a range of 1° to 45°. This is because if the angles θ exceed 45°, the gap s between each of the peripheral surfaces 22a and 23a of the laminating members 22 and 23 and each of the peripheral surfaces 24a and 25a of the protrusions 24 and 25 does not easily disappear by compressing in the second molding step, and thus the sealing property is degraded.

Figure 14:
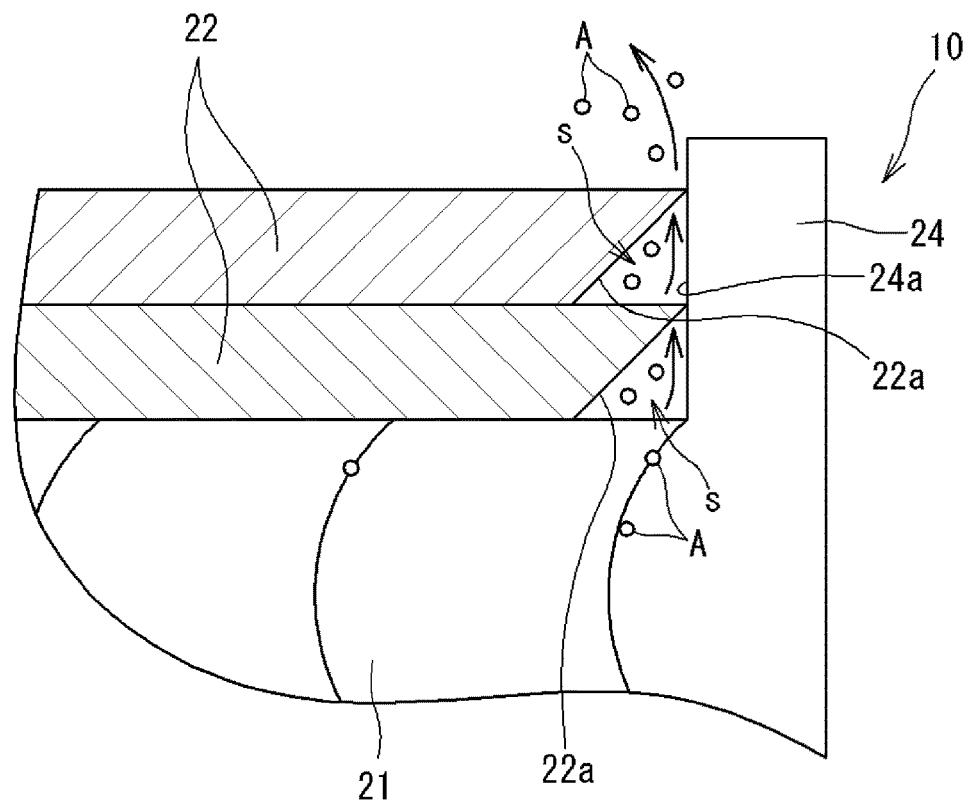
FIG. 14 is an enlarged cross-sectional view illustrating a part of a packing body and a first laminating member being compressed in a second molding step in a manufacturing method according to a modified example.

FIG. 14 is a cross-sectional view illustrating a relation between the first laminating member 22 and the first protrusion 24 before compressing in the second molding step of the manufacturing method according to the modified example.

In the modified example, the shape of the inner peripheral surface 22a of the first laminating member 22 is different from that of the embodiment illustrated in FIG. 13. Specifically, the inner peripheral surface 22a of the first laminating member 22 is formed as a tapered surface of which a radius decreases as it goes outward in the axial direction (upward in FIG. 14), that is, a tapered surface which is formed in a direction opposite to the embodiment illustrated in FIG. 13. The two first laminating members 22 having the same configuration are used.

Then, the inner peripheral surface 22a of the first laminating member 22 comes into line-contact with the outer peripheral surface 24a of the first protrusion 24, the axial contact length is shorter than the thickness dimension of the first laminating member 22, and a gap s is formed between both peripheral surfaces 22a and 24a. For that reason, the air A included inside the packing body 21 is easily discharged to the outside from a gap between the inner peripheral surface 22a of the first laminating member 22 and the outer peripheral surface 24a of the first protrusion 24 and thus the remaining of the air inside the first gland packing 10 can be suppressed.

In addition, FIG. 14 only illustrates a relation between the first laminating member 22 and the first protrusion 24. However, the outer peripheral surface 23a of the second laminating member 23 is also formed as a tapered surface in a direction opposite to that of the first embodiment and the front end of the tapered surface comes into line-contact with the inner peripheral surface 25a of the second protrusion 25.

Figure 15:
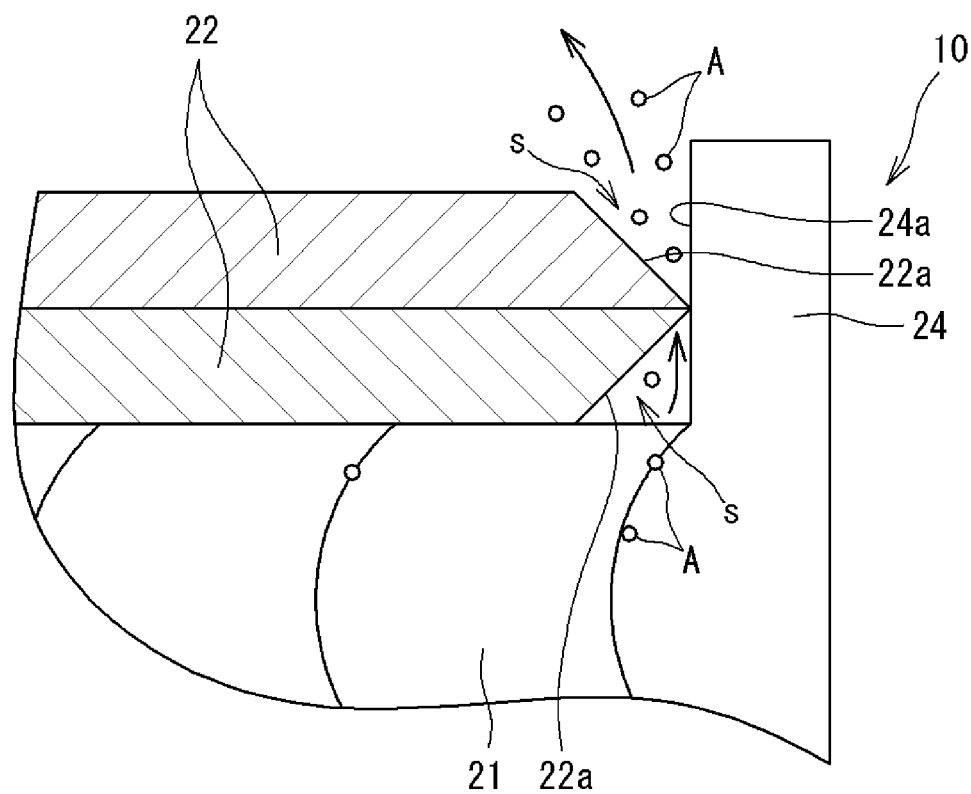
FIG. 15 is an enlarged cross-sectional view illustrating a part of a packing body and a first laminating member being compressed in a second molding step in a manufacturing method according to a modified example.

FIG. 15 is a cross-sectional view illustrating a relation between the first laminating member 22 and the second protrusion 24 before compressing in the second molding step of the manufacturing method according to the modified example.

In the modified example, the inner peripheral surfaces 22a of the two first laminating members 22 are formed as tapered surfaces which are inclined in the opposite directions to each other. Specifically, the inner peripheral surface 22a of the first laminating member 22 at the outside in the axial direction (the upside in FIG. 15) is formed so that a radius increases as it goes outward in the axial direction and the inner peripheral surface 22a of the first laminating member 22 at the inside of the axial direction (the downside in FIG. 15) is formed so that a radius decreases as it goes outward in the axial direction. The two first laminated members 22 having the same shape can be used by inverting the front and back sides of each other.

Even in the modified example, the inner peripheral surface 22a of each first laminating member 22 comes into line-contact with the outer peripheral surface 24a of the first protrusion 24, the axial contact length is shorter than the thickness dimension of the first laminating member 22, and a gap s is formed between both peripheral surfaces 22a and 24a. For that reason, the air A included in the packing body 21 is easily discharged to the outside through a gap between the inner peripheral surface 22a of the first laminating member 22 and the outer peripheral surface 24a of the first protrusion 24 and thus the remaining of the air inside the first gland packing 10 can be suppressed.

Additionally, FIG. 15 only illustrates a relation between the first laminating member 22 and the first protrusion 24. However, the outer peripheral surfaces 23a of the second laminating members 23 are also formed as tapered surfaces which are inclined in the opposite directions and the front end of the tapered surface comes into line-contact with the inner peripheral surface 25a of the second protrusion 25.

Figure 16:
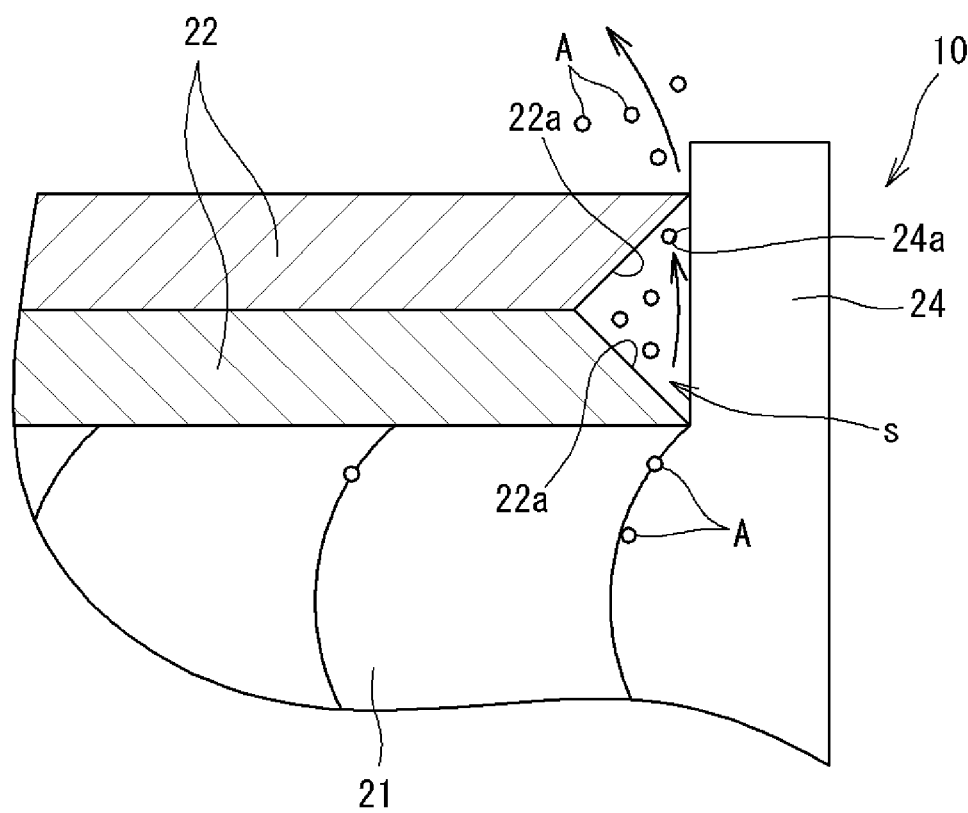
FIG. 16 is an enlarged cross-sectional view illustrating a part of a packing body and a first laminating member being compressed in a second molding step in a manufacturing method according to a modified example.

FIG. 16 is a cross-sectional view illustrating a relation between the first laminating member 22 and the second protrusion 24 before compressing in the second molding step of the manufacturing method according to the modified example.

Even in the modified example, the inner peripheral surfaces 22a of the two first laminating members 22 are formed as tapered surfaces which are inclined in the opposite directions. Specifically, the inner peripheral surface 22a of the first laminating member 22 at the outside of the axial direction (the upside in FIG. 16) is formed so that a radius decreases as it goes outward in the axial direction and the inner peripheral surface 22a of the first laminating member 22 at the inside of the axial direction (the downside in FIG. 16) is formed so that a radius increases as it goes outward in the axial direction. The two first laminated members 22 having the same shape can be used by inverting the front and back sides of each other.

Even in the modified example, the inner peripheral surface 22a of each first laminating member 22 comes into line-contact with the outer peripheral surface 24a of the first protrusion 24, the axial contact length is shorter than the thickness dimension of the first laminating member 22, and a gap s is formed between both peripheral surfaces 22a and 24a. For that reason, the air A included inside the packing body 21 is easily discharged to the outside from a gap between the inner peripheral surface 22a of the first laminating member 22 and the outer peripheral surface 24a of the first protrusion 24 and thus the remaining of the air inside the first gland packing 10 can be suppressed.

Figure 17:
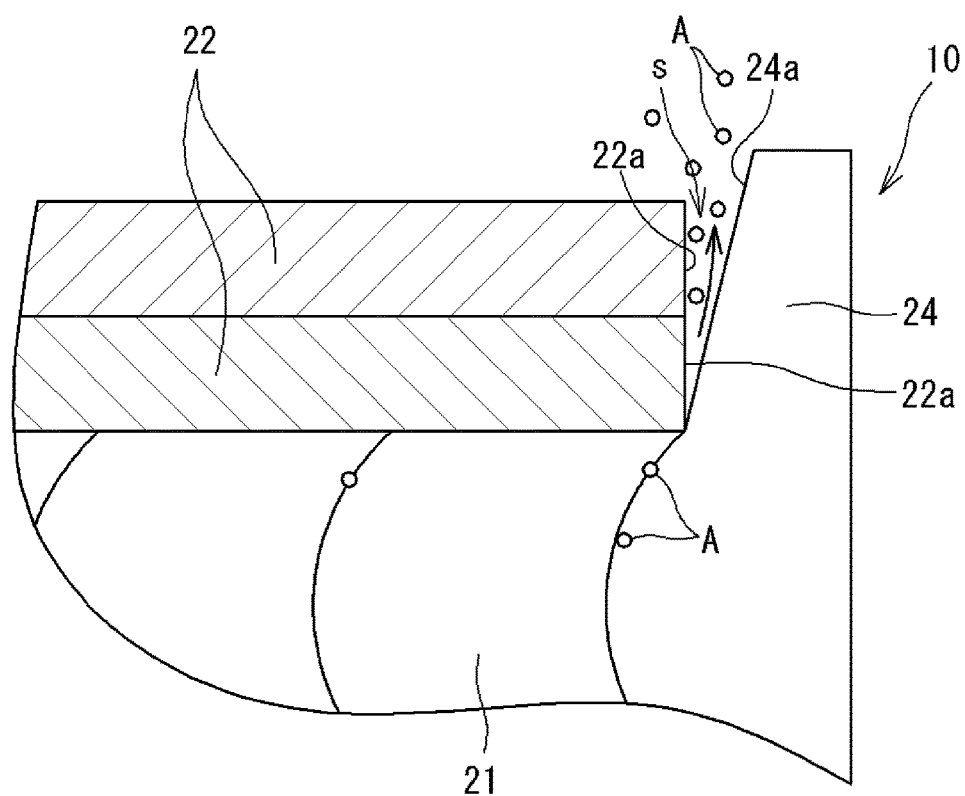
FIG. 17 is an enlarged cross-sectional view illustrating a part of a packing body and a first laminating member being compressed in a second molding step in a manufacturing method according to a modified example.

FIG. 17 is a cross-sectional view illustrating a relation between the first laminating member 22 and the second protrusion 24 before compressing in the second molding step of the manufacturing method according to the modified example.

In the modified example, each of the inner peripheral surfaces 22a of the two first laminating members 22 is formed in a cylindrical surface having a constant radius and the outer peripheral surface 24a of the first protrusion 24 is formed as a tapered surface. Thus, the outer peripheral surface 24a of the first protrusion 24 comes into line-contact with the inner peripheral surface 22a of the first laminating member 22, the axial contact length is shorter than the thickness dimension of the first laminating member 22, and a gap s is formed between both peripheral surfaces 22a and 24a.

Thus, even in the modified example, the air A included inside the packing body 21 is easily discharged to the outside from a gap between the inner peripheral surface 22a of the first laminating member 22 and the outer peripheral surface 24a of the first protrusion 24 and thus the remaining of the air inside the first gland packing 10 can be suppressed.

The inventor of the present application have performed the following test in order to verify the performance of the first gland packing manufactured by the manufacturing method of the invention.

First, five gland packings including the first gland packing according to the embodiment were loaded in a valve simulation device. As described above with reference to FIG. 1, the second gland packing was disposed at both ends in the axial direction and three first gland packings were disposed therebetween. As the dimensions of the gland packing, the inner diameter was 24 mm, the outer diameter was 37 mm, and the thickness was 6.5 mm.

Tightening pressures 20 N/mm², 40 N/mm², and 60 N/mm² were loaded on the gland packing and a He gas of 5.2 MPa was applied thereto. At each tightening pressure, the leakage amount of He was measured by a He leakage detector after 10 minutes.

For comparison, the first gland packing according to the related art was loaded instead of the first gland packing according to the embodiment and was subjected to the leakage amount test under the same condition. The result is illustrated in FIG. 18.

Figure 18:
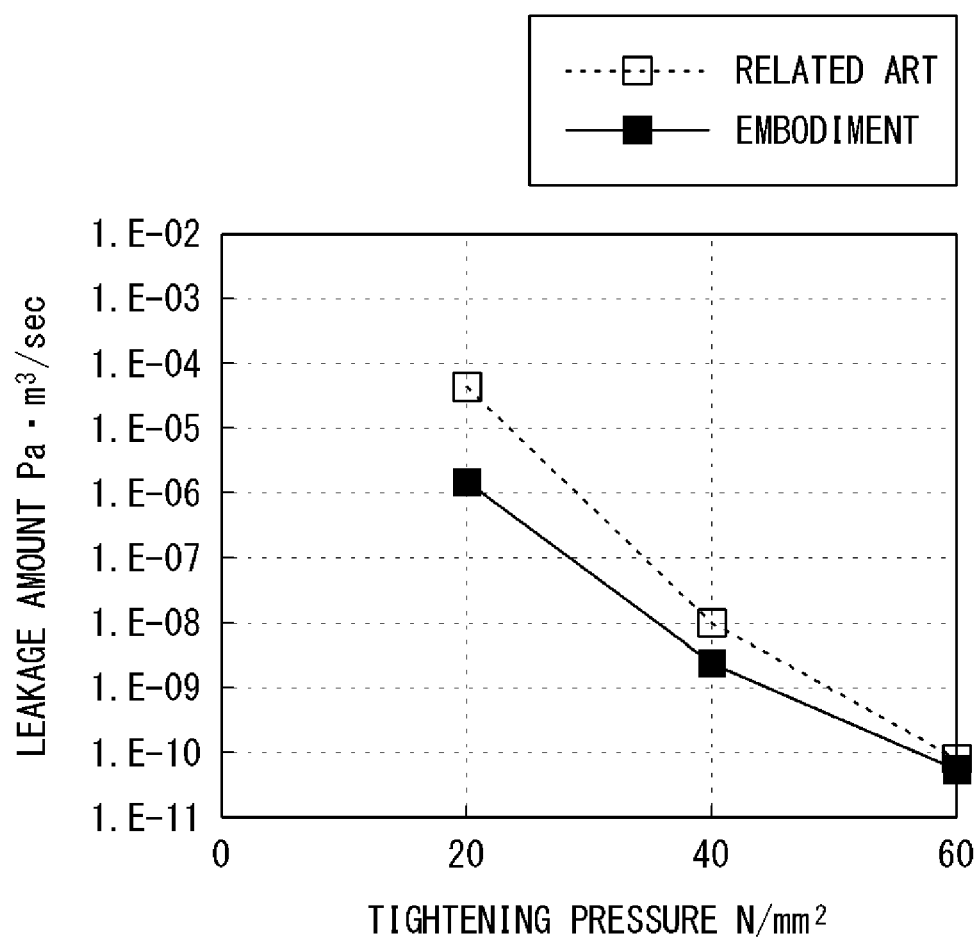
FIG. 18 is a graph illustrating a result of a leakage test.

As illustrated in FIG. 18, when the embodiment and the related art are compared with each other, it is understood that the He gas leakage amount is small and the sealing property is excellent in the embodiment. Particularly, it is understood that the leakage amount of the embodiment becomes smaller than the related art as the tightening pressure becomes lower. Thus, since the leakage amount decreases when the first gland packing is manufactured by the manufacturing method of the invention, the sealing property can be improved.

Next, the inventor of the present application manufactured the first gland packing according to the embodiment and the first gland packing according to the related art under the same condition and compared dimensions, masses, and densities. The result is illustrated in Table 1. Table 1 illustrates the measurement results (No. 1 to No. 10) of dimensions, masses, and densities of ten first gland packings of the embodiment and the related art and their average values.

TABLE 1

| | Related art | | | | | Embodiment | | | | |
|---|---|---|---|---|---|---|---|---|---|---|
| | Dimension (mm) | | | | | Dimension (mm) | | | | |
| No. | Inner diameter | Outer diameter | Height | Mass (g) | Density (g/cm³) | Inner diameter | Outer diameter | Height | Mass (g) | Density (g/cm³) |
| 1 | 24.05 | 36.92 | 6.49 | 6.15 | 1.54 | 24.04 | 36.92 | 6.38 | 6.14 | 1.56 |
| 2 | 24.03 | 36.95 | 6.51 | 6.16 | 1.53 | 24.06 | 36.93 | 6.40 | 6.15 | 1.56 |
| 3 | 24.06 | 36.96 | 6.50 | 6.15 | 1.53 | 24.05 | 36.95 | 6.39 | 6.16 | 1.56 |
| 4 | 24.05 | 36.94 | 6.52 | 6.17 | 1.53 | 24.06 | 36.92 | 6.42 | 6.15 | 1.56 |
| 5 | 24.07 | 36.95 | 6.49 | 6.17 | 1.54 | 24.06 | 36.94 | 6.40 | 6.14 | 1.55 |
| 6 | 24.04 | 36.95 | 6.48 | 6.18 | 1.54 | 24.07 | 36.95 | 6.38 | 6.13 | 1.56 |
| 7 | 24.05 | 36.94 | 6.45 | 6.15 | 1.54 | 24.03 | 36.94 | 6.36 | 6.15 | 1.56 |
| 8 | 24.04 | 36.93 | 6.51 | 6.15 | 1.53 | 24.04 | 36.93 | 6.40 | 6.16 | 1.56 |
| 9 | 24.03 | 36.92 | 6.52 | 6.14 | 1.53 | 24.06 | 36.92 | 6.38 | 6.15 | 1.57 |
| 10 | 24.06 | 36.94 | 6.50 | 6.13 | 1.53 | 24.07 | 36.94 | 6.37 | 6.14 | 1.56 |
| Average | 24.05 | 36.94 | 6.50 | 6.16 | 1.53 | 24.05 | 36.93 | 6.39 | 6.15 | 1.56 |

When the first gland packing according to the embodiment and the first gland packing according to the related art are compared with each other, both have substantially the same values regarding the average values of the inner diameter, the outer diameter, and the mass. However, the average value of the height dimension is small in the first gland packing according to the embodiment and the average value of the density is large in the first gland packing according to the embodiment. Accordingly, these values are closer to the originally desired values. This is because the air A included in the first gland packing is discharged in the second molding step. Thus, when the first gland packing is manufactured according to the manufacturing method of the invention, the accuracy of the dimension (particularly, the height dimension) and the density can be improved.

The invention is not limited to the above-described embodiment and can be appropriately modified within the scope of claims.

REFERENCE SIGNS LIST

10: first gland packing
21: packing body
22: first laminating member
22a: inner peripheral surface
23: second laminating member
23a: outer peripheral surface
24: first protrusion
24a: outer peripheral surface
25: second protrusion 25a: inner peripheral surface
27: contact surface

The invention claimed is:

1. A gland packing comprising:
an annular packing body which is formed by winding an expanded graphite tape material in a spiral shape; and
a laminating member that is bonded to an axial end surface of the packing body and is formed of an annular expanded graphite sheet material, the axial end surface of the packing body being provided with a protrusion facing and contacting an inner peripheral surface or an outer peripheral surface of the laminating member in the radial direction,
wherein a contact surface between the protrusion and the laminating member is formed so that a radius of a peripheral surface of the laminating member changes in at least a part in the axial direction and a peripheral surface of the protrusion is shaped to densely contact the peripheral surface of the laminating member such that a path formed by the contact surface is non-linear.

2. The gland packing according to claim 1,
wherein the contact surface has a tapered surface of which a radius changes at a constant rate in the axial direction.

3. The gland packing according to claim 2,
wherein a plurality of the laminating members is laminated in the axial direction and the contact surfaces of the laminating members have tapered surfaces which are inclined in the same direction.

4. The gland packing according to claim 2,
wherein a plurality of the laminating members is laminated in the axial direction and the contact surfaces of the laminating members have tapered surfaces which are inclined in different directions.

5. The gland packing according to claim 1,
wherein the contact surface has a curved surface.

6. A method of manufacturing a gland packing comprising:
a first step of molding an annular packing body having a protrusion formed at an axial end surface by winding an expanded graphite tape material in a spiral shape and compressing the tape material; and
a second step of allowing an annular laminating member formed of an expanded graphite sheet material to overlap the end surface of the packing body and compressing the packing body and the laminating member while a peripheral surface of the laminating member contacts a peripheral surface of the protrusion,
wherein in the second step, an axial contact length between the peripheral surface of the laminating member and the peripheral surface of the protrusion before compressing is set to be shorter than a thickness dimension of the laminating member,
wherein the compressing in the second step includes shaping the peripheral surface of the protrusion to densely contact the peripheral surface of the laminating member and forming a path for the contact surface that is non-linear.

7. The method of manufacturing the gland packing according to claim 6,
wherein in the second step, the peripheral surface of the laminating member and the peripheral surface of the protrusion come into line-contact with each other before compressing.

8. The method of manufacturing the gland packing according to claim 7,
wherein in the second step, at least one of the peripheral surface of the laminating member and the peripheral surface of the protrusion before compressing is formed so that a radius changes in at least a part in the axial direction.

9. The method of manufacturing the gland packing according to claim 8,
wherein at least one of the peripheral surface of the laminating member and the peripheral surface of the protrusion has a tapered surface.

10. The method of manufacturing the gland packing according to claim 9,
wherein a plurality of the laminating members is laminated in the axial direction and the peripheral surfaces of the laminating members have tapered surfaces which are inclined in the same direction.

11. The method of manufacturing the gland packing according to claim 9,
wherein a plurality of the laminating members is laminated in the axial direction and the peripheral surfaces of the laminating members have tapered surfaces which are inclined in the opposite directions.

12. The method of manufacturing the gland packing according to claim 6,
wherein in the second step, at least one of the peripheral surface of the laminating member and the peripheral surface of the protrusion before compressing is formed so that a radius changes in at least a part in the axial direction.

13. The method of manufacturing the gland packing according to claim 12,
wherein at least one of the peripheral surface of the laminating member and the peripheral surface of the protrusion has a tapered surface.

14. The method of manufacturing the gland packing according to claim 13,
wherein a plurality of the laminating members is laminated in the axial direction and the peripheral surfaces of the laminating members have tapered surfaces which are inclined in the same direction.

15. The method of manufacturing the gland packing according to claim 13,
wherein a plurality of the laminating members is laminated in the axial direction and the peripheral surfaces of the laminating members have tapered surfaces which are inclined in the opposite directions.

16. The method of manufacturing the gland packing according to claim 6, further comprising forming a gap between the peripheral surface of the laminating member and the peripheral surface of the protrusion.

17. The method of manufacturing the gland packing according to claim 16, wherein the compressing in the second step includes discharging air through a contact surface and the gap between the peripheral surface of the laminating member and the peripheral surface of the protrusion.

* * * * *